United States Patent
Patterson et al.

(10) Patent No.: US 6,707,376 B1
(45) Date of Patent: Mar. 16, 2004

(54) PULSED POWER METHOD FOR INCREASED READ RANGE FOR A RADIO FREQUENCY IDENTIFICATION READER

(75) Inventors: Hubert A. Patterson, Boca Raton, FL (US); Philip A. Lazo, Fort Lauderdale, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/216,576

(22) Filed: Aug. 9, 2002

(51) Int. Cl.[7] ............................................. H04Q 5/22
(52) U.S. Cl. .................. 340/10.3; 340/10.34; 340/10.2
(58) Field of Search ........................ 340/572.1, 572.4, 340/10.1, 10.2, 10.3, 10.34

(56) References Cited

U.S. PATENT DOCUMENTS

| | | | |
|---|---|---|---|
| 5,153,583 A | * 10/1992 | Murdoch | 340/512 |
| 5,621,412 A | * 4/1997 | Sharpe et al. | 340/10.34 |
| 5,673,037 A | * 9/1997 | Cesar et al. | 235/385 |
| 5,818,348 A | * 10/1998 | Walczak et al. | 340/10.4 |
| 5,847,662 A | * 12/1998 | Yokota et al. | 340/10.31 |
| 5,856,788 A | * 1/1999 | Walter et al. | 235/375 |
| 5,883,582 A | 3/1999 | Bowers et al. | 340/825.54 |
| 6,084,512 A | * 7/2000 | Elberty et al. | 340/572.1 |
| 6,104,333 A | * 8/2000 | Wood, Jr. | 340/10.4 |
| 6,236,315 B1 | 5/2001 | Helms et al. | 340/572.7 |
| 6,535,109 B1 | * 3/2003 | Mahdavi | 340/10.3 |
| 6,617,962 B1 | * 9/2003 | Horwitz et al. | 340/10.4 |

* cited by examiner

Primary Examiner—Benjamin C. Lee
Assistant Examiner—Son Tang

(57) ABSTRACT

A method to power a radio frequency identification (RFID) reader to increase multi-tag reading capability and increase the reading range of a passive tag without maximizing the continuous transmitted power level is provided. The RFID reader transmits a pulsed interrogation signal until an RFID tag response is received, and then switches to a continuous and pulsed power scheme. The continuous power emitted maintains the power supplied to the RFID tags so the tags will not reset due to loss of power. The pulsed signal permits reading the tags at longer ranges, especially when there is a plurality of tags in the area.

6 Claims, 4 Drawing Sheets

PULSED POWER METHOD FOR INCREASED READ RANGE FOR A RADIO FREQUENCY IDENTIFICATION READER

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates to radio frequency identification (RFID) reader power output, and more particularly a method of pulsed and continuous power output for an RFID reader.

2. Description of the Related Art

RFID systems are increasingly used for a variety of applications including inventory control and article monitoring. In RFID systems, an RFID reader transmits an RFID interrogation signal. An RFID marker or tag receives the transmitted RF interrogation signal and responds with a reply signal that includes identification information and other data as known in the art. The RFID reader receives the RFID marker's reply signal and recovers the relevant information contained within the signal. The RFID marker must be within a predetermined maximum radius from the RFID reader for the RFID reader to be able to detect and retrieve data from the RFID marker's reply signal. If the RFID reader does not receive a reply signal, the RFID reader will continue to transmit the RFID interrogation signal, which will be radiated into the environment.

Passive RFID tags are powered by the transmitted interrogation signal from the RFID reader. When the interrogation signal is received, the tag will reply with its stored data. The time for round trip communication between the reader and marker is dependent on the amount of data being transferred and the data rate. When there are multiple tags within the transmitted interrogation signal, a multi-tag algorithm is used to sort out the data from each tag, which increases the read time. Finding a single tag may take on the order of 10 msec, and up to 100 msec or more if there are a larger number of tags in the area. The slowing of read time is related to how the system handles the previously read tags. Once a tag has identified itself to the reader and its data is transferred, the tag is instructed to "remember" that it was read and stops replying to the interrogation field. The reader can then go onto the next tag. When the interrogation field incident on a tag drops below a threshold value, the tag times-out, or "forgets" that it was read. The tag will be reset and begin to respond again when the interrogation field rises above the threshold value. Tags located at the fringe of the interrogation field level corresponding to the threshold value for powering a tag will be constantly resetting. If tags try to re-communicate at frequent intervals, the multi-tag algorithm will slow and may not be able to read all the tags within the reading range.

The speed and range of reading is reduced according to the number of tags being powered by the interrogation signal and the power level of the field. To improve the situation active RFID tags can be utilized. An active RFID tag includes a battery to power the tag. Unfortunately, active RFID tags are too expensive for many applications. Alternately, RFID readers can transmit at higher power levels to keep multiple passive tags powered during reading, providing for increased read range. However, restrictions on RF emissions limit the power level at which RFID readers can operate.

BRIEF SUMMARY OF THE INVENTION

The present invention provides a method to power an RFID reader to increase multi-tag-reading capability, and increase passive reading range without maximizing the transmitted power level. The method encompasses transmitting a radio frequency identification interrogation signal to increase a radio frequency identification tag reading range by first transmitting a pulsed radio frequency identification interrogation signal. When a response signal from a radio frequency identification tag is received, the pulsed radio frequency identification interrogation signal and a continuous radio frequency identification interrogation signal are transmitted simultaneously. After no further response signals from radio frequency identification tags are received, the system again begins transmitting only the pulsed radio frequency identification interrogation signal.

The method further includes, after receiving a response signal, reading data associated with the radio frequency identification tag, and, then turning the radio frequency identification tag off so that it no longer responds to the radio frequency identification interrogation signal.

The method may also include, prior to transmitting only the pulsed radio frequency identification interrogation signal after not receiving a response signal from another radio frequency identification tag, turning all radio frequency identification tags on. Alternately, only a specific or preselected radio frequency identification tag is turned on.

Objectives, advantages, and applications of the present invention will be made apparent by the following detailed description of embodiments of the invention.

DETAILED DESCRIPTION OF THE INVENTION

Regulations in the United States and Europe limit the power level of transmissions from RFID readers. For example, at 2450 MHz, regulations limit RFID emissions to 500 mwatts continuous or 4 watts at a 15% duty cycle measured over 200 msec. Continuous transmission at 500 mwatts will only provide reading ranges on the order of 10–20 inches. To increase read range, the transmission can be pulsed at up to 4-watts for 30 msec at a time, per the regulations. Thirty msec is insufficient time for a multi-tag algorithm to execute. The tags may reset during the off time between 30 msec pulses, and the reader will read some tags multiple times while other tags may never be read.

Figure 1:
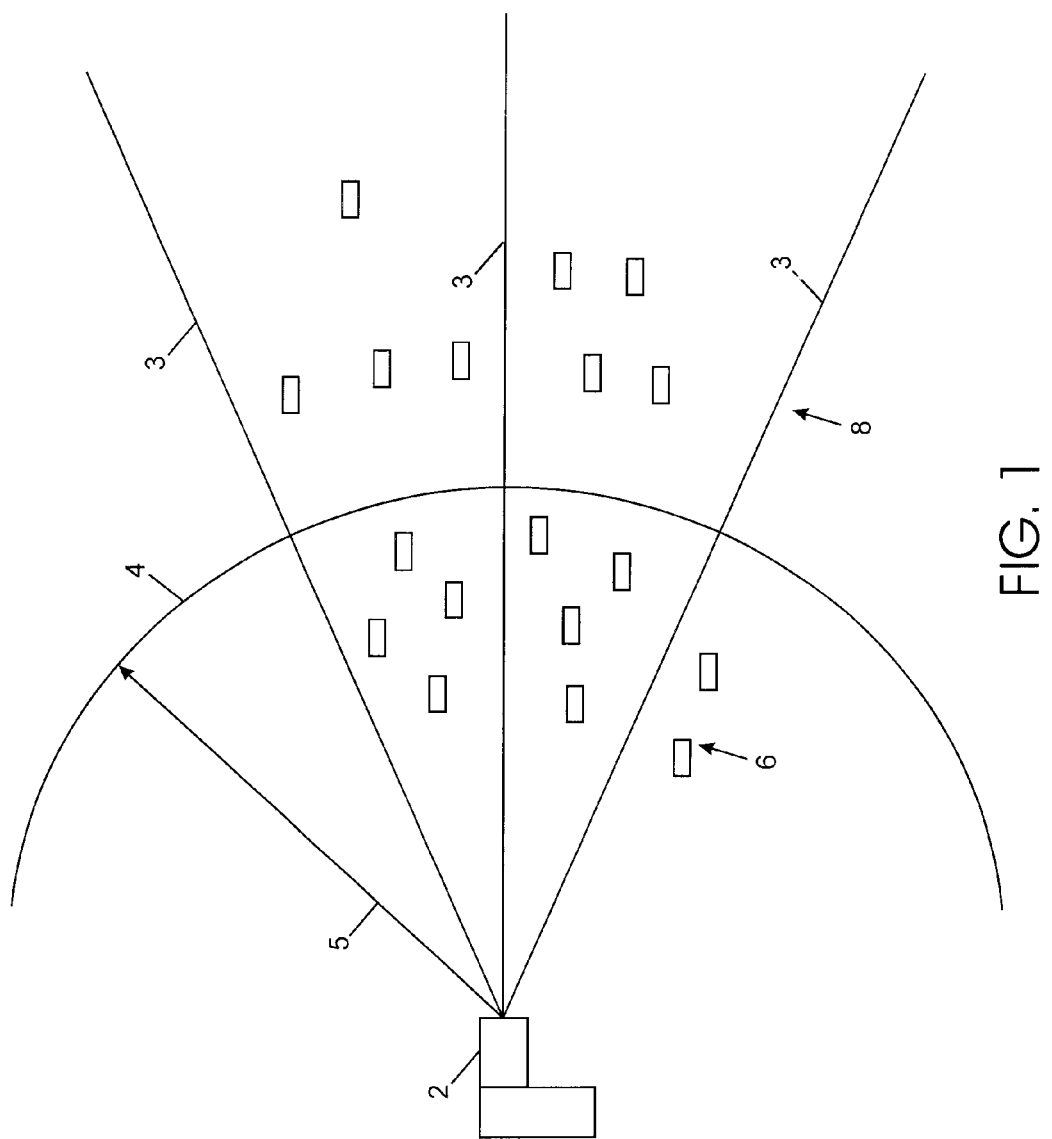
FIG. 1 is a schematic representation of one embodiment of the present invention.

Referring to FIG. 1, one solution to the problem is to simultaneously transmit a continuous interrogation signal and a pulsed interrogation signal. The continuous transmission will keep tags "alive" so they do not reset between pulses. The pulsed signal will increase read range, while the continuous signal will reduce read time. RFID reader 2 transmits a pulsed interrogation signal represented by rays 3, and a continuous interrogation signal represented by curve 4. Curve 4 illustrates the continuous power level threshold generated by RFID reader within radius 5, which is of sufficient level to maintain power-on to tags 6 that are relatively near reader 2. Distant tags 8 that are beyond radius 5 will be energized by the pulsed interrogation signals 3, but may time-out between pulses. Typically, each tag contains a small capacitor to hold power on for a period of time. Conventional RFID readers do not transmit the pulsed signals 3, and therefore read range is limited to those tags that fall within radius 5. If only pulsed interrogation signals 3 are transmitted, near tags 6 and farther tags 8 are all capable of timing-out between pulses causing a delay in tag reading. If continuous interrogation signal 4 is simultaneously transmitted with pulsed interrogation signals 3, tags 6 will remain on and communication can be completed in an orderly fashion, as fully explained below, before more distant tags 8 are read. The distant tags 8 will be read by the pulsed interrogation signal 3, but because of the potential for time-out and resetting, tags 8 will take longer to read that tags 6, which remain energized. A multi-tag algorithm can be used to quickly read tags 6, which remain energized by the continuous interrogation signal 4, thus the reading time of all tags, 6 and 8, within the range of pulsed interrogation signal 3 will be improved.

Communication between RFID reader 2 and RFID tags depend on the particular protocol used, as known in the art. In one example used herein to illustrate the invention, the RFID reader transmits a coded interrogation signal to look for a tag. A tag receiving the interrogation signal responds with a tag ID. The reader then uses the tag ID to address that particular tag, causing the tag to transmit its stored data. The stored data can be any variety of information, and is normally associated with the article to which the tag is attached. The reader can then tell the tag to turn-off for now so that it will not continue to respond to the interrogation signal. The reader will then select another tag ID and poll that tag for its data, and so on until all of the tags have been read. When no more tag IDs are being received, the reader may send a wake-up signal to turn all of the tags on, or alternately, one or more tags can be addressed individually to turn-on. If no wake up signal is sent to turn on the tags, they typically will automatically turn back on after a preselected time has expired.

The solution discussed above for transmitting a continuous and pulsed interrogation signal may result in interference with adjacent RFID readers and other systems. Therefore, the continuous interrogation signal is turned-on only after the pulsed interrogation signal detects tags in the area. In the protocol example provided herein, when the RFID reader detects a tag ID, the continuous interrogation signal is turned-on.

Figure 2:
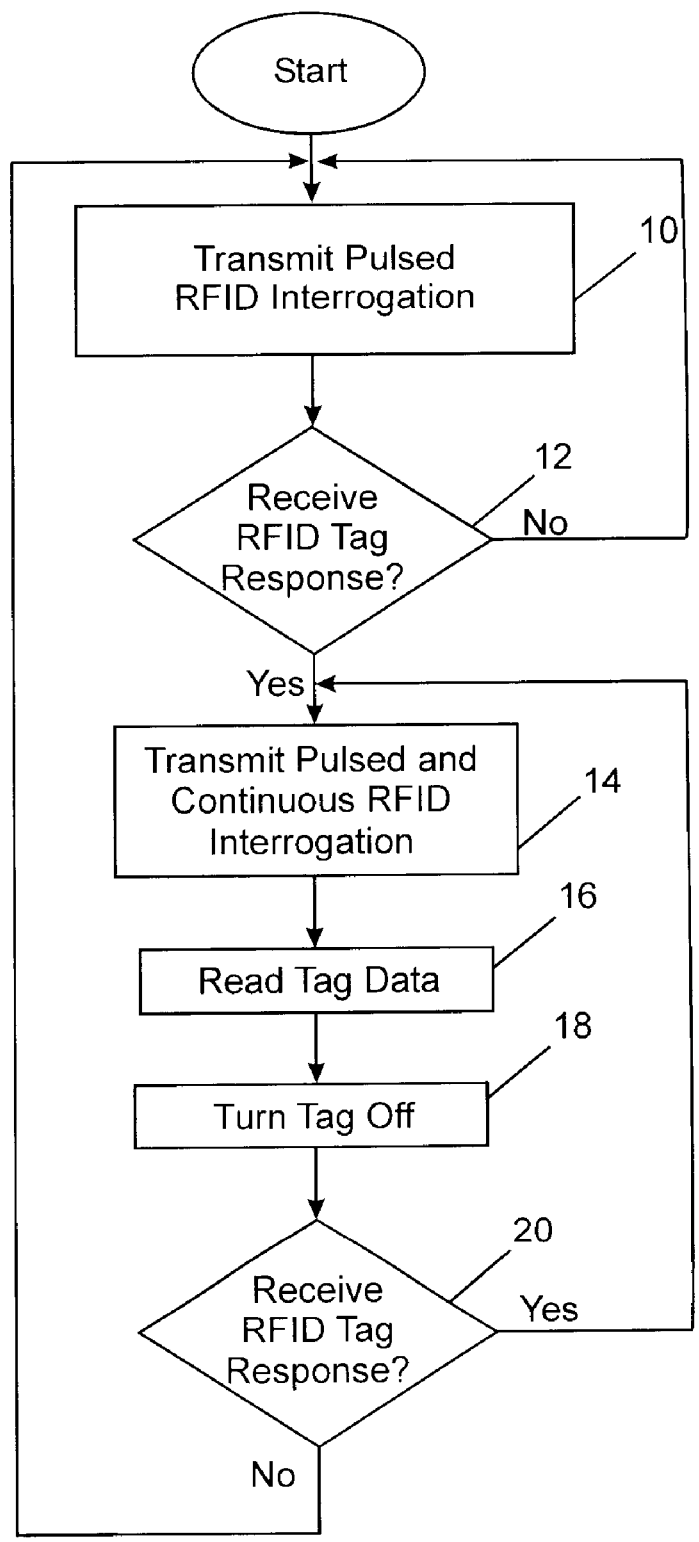
FIG. 2 is a flow chart of the inventive method.
Figure 3:
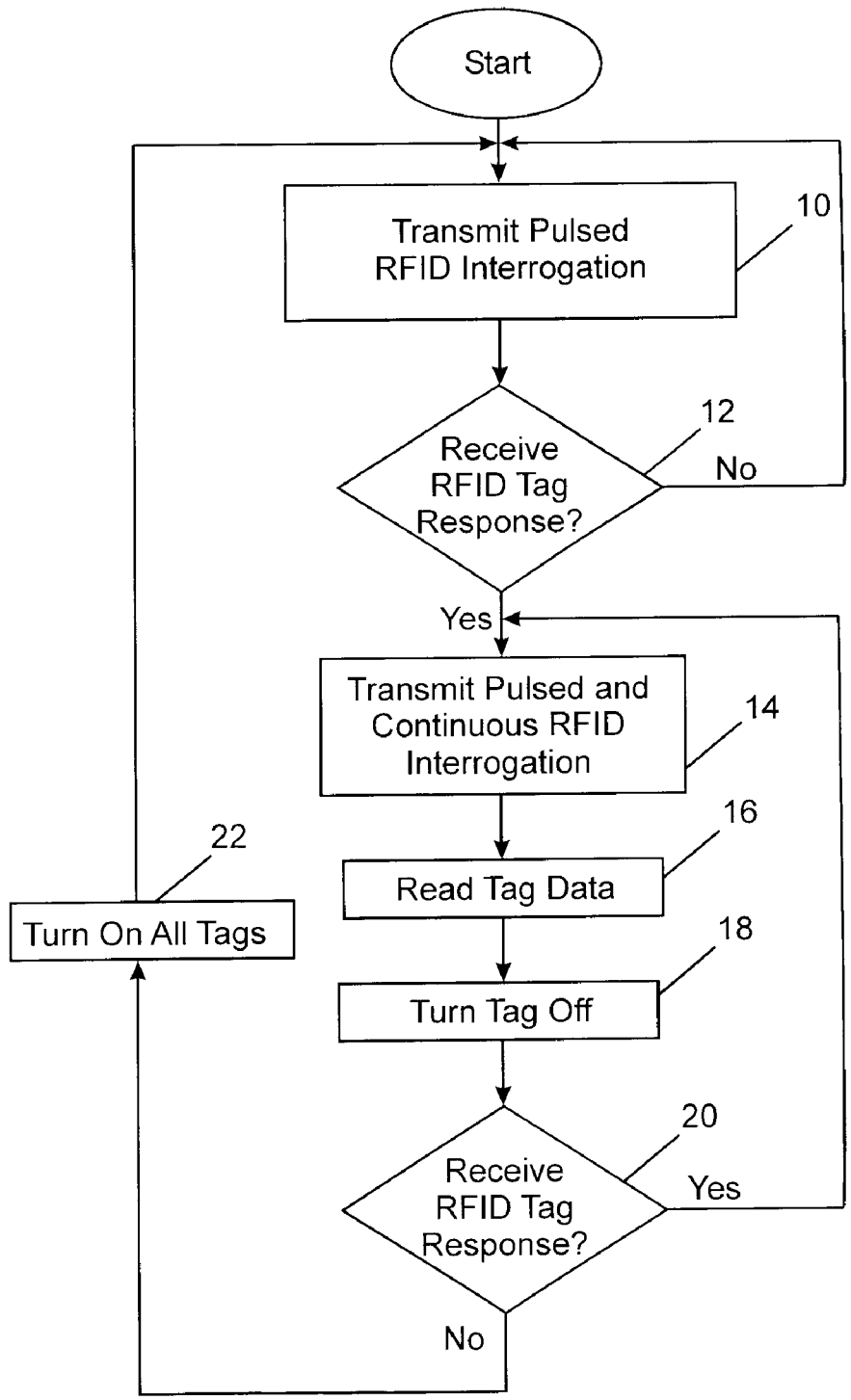
FIG. 3 is an alternate embodiment of that shown in FIG. 2.
Figure 4:
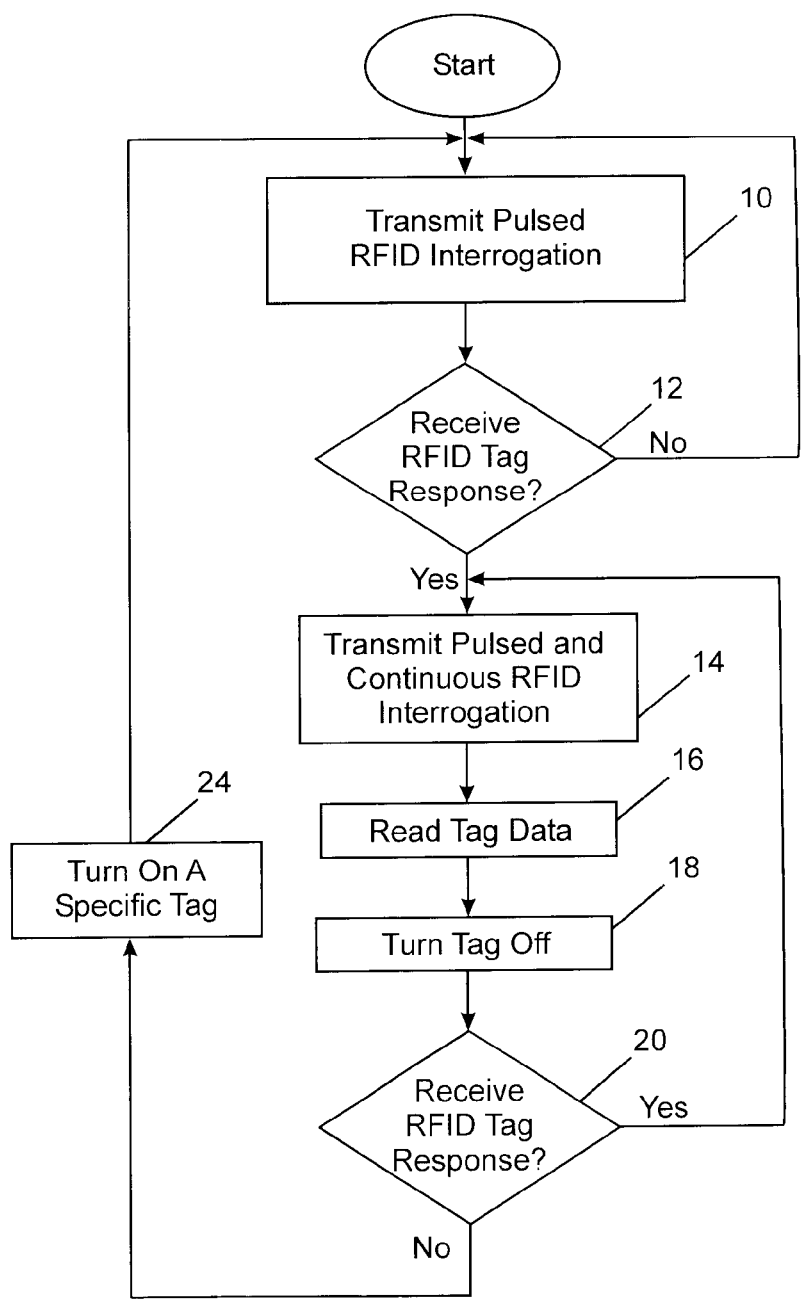
FIG. 4 is an alternate embodiment of that shown in FIG. 2.

The method is illustrated in FIG. 2. The RFID reader initially transmits a pulsed RFID interrogation signal at 10. If the RFID reader receives an RFID tag response at 12, the RFID reader begins to transmit both the pulsed RFID interrogation signal and a continuous RFID interrogation signal at 14. The tag data is read at 16 and the tag is turned-off at 18 so that it will not continue to respond to the interrogation signal. If another tag response is received at 20, the RFID reader continues to transmit the pulsed and continuous signals until all of the tag data is read from all of the tags at 16 and 18, respectively. When no further tag responses are received at 20, the RFID reader again begins to transmit only the pulsed interrogation signal at 10, and the method continues. The tags that have been turned-off will eventually time-out and automatically turn-on. Alternately as illustrated in FIG. 3, the RFID reader can send a signal to turn on all tags at 22. And, as illustrated in FIG. 4, the RFID reader can send a signal to a specific tag or a specific group of tags to turn-on only that tag or tags. For example, when an RFID reader, which also writes data, has changed tag data on a selected tag or tags, the new tag data can be verified without having to rereading all of the tags in a given area.

It is to be understood that variations and modifications of the present invention can be made without departing from the scope of the invention. For example, the transmitted pulses do not need to be 30 msec long as described above, but can be selected according to the RFID semiconductor current drain, data rate, and other relevant parameters. The repetition rate could, for example be 5 msec every 33 msec, or another selected rate. The power levels transmitted can also vary and are limited only by government regulation.

It is also to be understood that the scope of the invention is not to be interpreted as limited to the specific embodiments disclosed herein, but only in accordance with the appended claims when read in light of the forgoing disclosure.

What is claimed is:

1. A method for transmitting a radio frequency identification interrogation signal for increasing a radio frequency identification tag reading range, comprising:

transmitting a pulsed radio frequency identification interrogation signal;

receiving a response signal from a radio frequency identification tag;

after receiving said response signal, transmitting said pulsed radio frequency identification interrogation signal and a continuous radio frequency identification interrogation signal simultaneously; and, after not receiving a response signal from another radio frequency identification tag, transmitting only said pulsed radio frequency identification interrogation signal.

2. The method of claim 1 further comprising, after receiving said response signal, reading data associated with said radio frequency identification tag; and, turning said radio frequency identification tag off wherein said radio frequency identification tag does not emit a response signal.

3. The method of claim 2 further comprising, prior to transmitting only said pulsed radio frequency identification interrogation signal after not receiving a response signal from another radio frequency identification tag, turning all radio frequency identification tags on.

4. The method of claim 2 further comprising, prior to transmitting only said pulsed radio frequency identification interrogation signal after not receiving a response signal from another radio frequency identification tag, turning a preselected radio frequency identification tag on.

5. The method of claim 1 wherein transmitting the pulsed radio frequency identification interrogation signal comprises transmitting a pulsed radio frequency identification interrogation signal at a level of up to about 4-watts at a 15% duty cycle measured over about 200 msec.

6. The method of claim 5 wherein transmitting the pulsed radio frequency identification interrogation signal and the continuous radio frequency identification interrogation signal comprises transmitting said pulsed radio frequency identification interrogation signal and a continuous radio frequency identification interrogation signal at a level of up to about 500 mwatts.

* * * * *